(12) United States Patent
Balliette et al.

(10) Patent No.: US 8,256,078 B2
(45) Date of Patent: Sep. 4, 2012

(54) METHOD OF FORMING LONG STRIPS OF DIELECTRIC COATED METALIZED FILM

(75) Inventors: William M. Balliette, Austin, TX (US); Keith D. Jamison, Austin, TX (US)

(73) Assignee: Faradox Energy Storage, Inc., Austin, TX (US)

( * ) Notice: Subject to any disclaimer, the term of this patent is extended or adjusted under 35 U.S.C. 154(b) by 39 days.

(21) Appl. No.: 12/829,718

(22) Filed: Jul. 2, 2010

(65) Prior Publication Data

US 2012/0002347 A1 Jan. 5, 2012

(51) Int. Cl.
*H01G 7/00* (2006.01)
(52) U.S. Cl. .............. 29/25.42; 29/25.03; 29/25.41; 361/303; 427/79
(58) Field of Classification Search ...... 29/25.41–25.42, 29/830–831, 846–847; 427/27, 64, 73, 79–81; 361/273, 301.5, 308.1; 438/28–29
See application file for complete search history.

(56) References Cited

U.S. PATENT DOCUMENTS

| | | | |
|---|---|---|---|
| 4,895,630 A | 1/1990 | Aufderheide | |
| 5,019,418 A * | 5/1991 | Linzey et al. | 427/79 |
| 5,576,925 A | 11/1996 | Gorowitz | |
| 5,844,770 A * | 12/1998 | Fries-Carr et al. | 361/301.5 |
| 5,912,044 A * | 6/1999 | Farooq et al. | 427/79 |
| 6,493,206 B1 * | 12/2002 | King | 361/301.5 |
| 6,841,080 B2 * | 1/2005 | Kingon et al. | 216/6 |
| 7,281,321 B2 * | 10/2007 | Kim et al. | 29/832 |
| 7,291,185 B2 * | 11/2007 | Shiota et al. | 29/25.03 |
| 7,460,352 B2 | 12/2008 | Jamison et al. | |
| 7,596,842 B2 * | 10/2009 | Andresakis et al. | 29/25.42 |
| 2005/0141169 A1 | 6/2005 | Yamasaki | |
| 2010/0085682 A1 | 4/2010 | Abe | |

\* cited by examiner

*Primary Examiner* — Minh Trinh
(74) *Attorney, Agent, or Firm* — Claude E. Cooke, Jr.; John J. Love; Cooke Law Firm

(57) ABSTRACT

A method for forming a plurality of strips to be used for formulating high-breakdown strength and high-temperature capacitors is disclosed. The method includes forming a metalized substrate having a particular pattern, masking a portion of the metalized substrate, coating the metalized substrate with a dielectric material and removing the masking material and thus the dielectric layer from a portion of the metalized layer to form a contact surface. In lieu of placing a masking material on the metalized substrate, the exposed contact area can be formed by shielding a portion of the metalized substrate while depositing the dielectric layer.

13 Claims, 6 Drawing Sheets

METHOD OF FORMING LONG STRIPS OF DIELECTRIC COATED METALIZED FILM

BACKGROUND OF INVENTION

1. Field of the Invention

This invention described and disclosed in this application is for a method of forming long strips of dielectric coated metalized film that are used to form high-breakdown strength and high-temperature capacitors.

2. Description of Related Art

U.S. Pat. No. 7,460,352, the contents of which is hereby incorporated by reference, discloses a method of forming high energy density wound capacitors using long strips of metalized substrate coated with a dielectric. As shown in FIG. 2 of the patent the strips include an insulating substrate 22, metalized layers 23 and 25 on each side of the substrate and dielectric layers 24, 26. The dielectric material is deposited on the metalized film. In order to provide an electrical contact area without the dielectric coating, a mask is positioned over a portion of the film as it is transported and coated with the dielectric, thus leaving an exposed edge of the metalized substrate, see column 4, lines 19-24.

BRIEF SUMMARY OF THE INVENTION

The invention disclosed in this application is for a method to manufacture a long, narrow dielectric coated metalized polymer film by taking a wide polymer film with a metal pattern on both sides, then masking certain regions of the film so the dielectric is not deposited in these regions, or coating the film with a lift-off mask in certain regions so that after the dielectric is deposited it can be removed later from those regions as the lift-off mask is removed. In both approaches, the wide polymer film is comprised of multiple narrow strips with metal regions that are either exposed or can be exposed for the purpose of electrical contact. The narrow strips may be slit (or singulated) from the wide polymer film and then wound into capacitors. For the lift-off mask approach, the mask may be removed before or after slitting. The end result is a long narrow strip of dielectric coated metalized polymer film with a strip of uncoated metalized polymer on both sides.

By starting with a wide strip of metalized film according to a given metal pattern and forming plural strips of a metalized substrate coated with a dielectric in certain regions and uncoated in certain other regions, a cheaper and more efficient method of producing the final capacitor is achieved.

BRIEF DESCRIPTION OF THE SEVERAL VIEWS OF THE DRAWING(S)

DETAILED DESCRIPTION OF THE INVENTION

Figure 1:
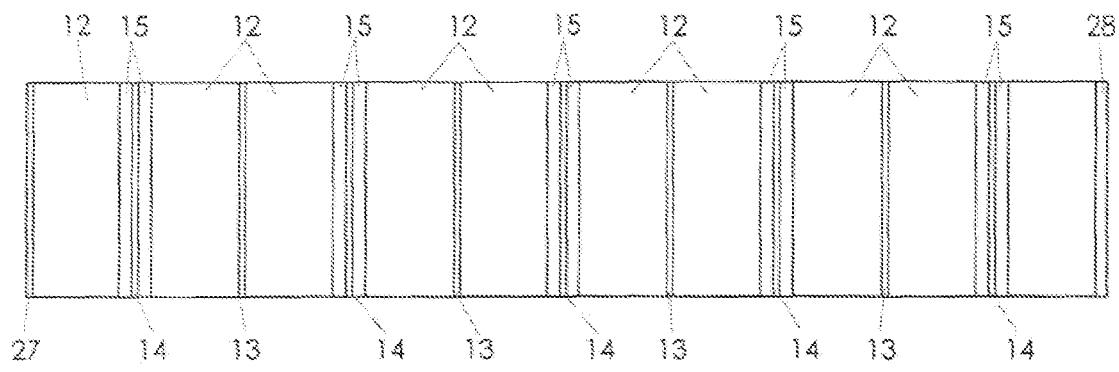
FIG. 1 is a top view of a portion of the metalized substrate.

FIG. 1 illustrates an example of a metalized substrate with a particular pattern required for a narrow capacitor electrode. The pattern is repeated over the width of the substrate on both sides. The film includes an insulating substrate 21 which may be formed from a variety of materials as disclosed in U.S. Pat. No. 7,460,352, and a metalized coating 12 on each side of the substrate 21. On portions of the strip the metal coating is thicker as shown at 15 in FIGS. 1 and 2.

Figure 3:
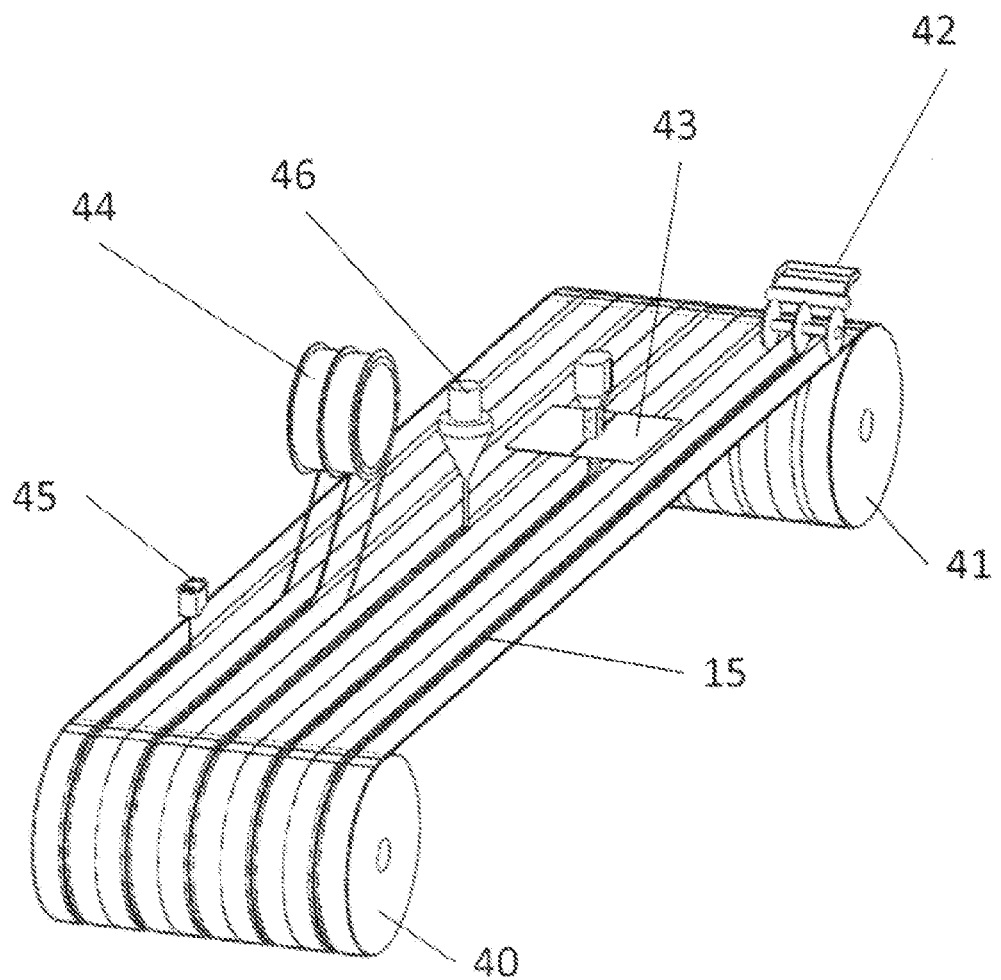
FIG. 3 is a perspective view showing various embodiments of the various devices used to place the masking material on the metalized substrate.

The pattern of the film can be described by reference to FIG. 1. At the left side portion of film 10 there is a first uncoated portion 27 of the substrate 21. A number of sections 12 represent portions of the film that are coated with a metal layer of a first thickness. Sections 15 of the film represent portions of the film that are coated with a layer of metal thicker than that of layer 12. The film is formed as a roll of material having the pattern of FIG. 1 along its width and length as shown in FIG. 3.

Portions 13 which are intermediate between the metalized portions of the film represent areas of the substrate that are not coated with a metal. Right edge portion 28 of the substrate is also not coated with a metal. The film as described to this point is commercially available from Steiner Film Inc. or other vendors in various patterns. The materials used for the various components of the film are described in U.S. Pat. No. 7,460,352 and other materials known in the art may be used.

Figure 2:
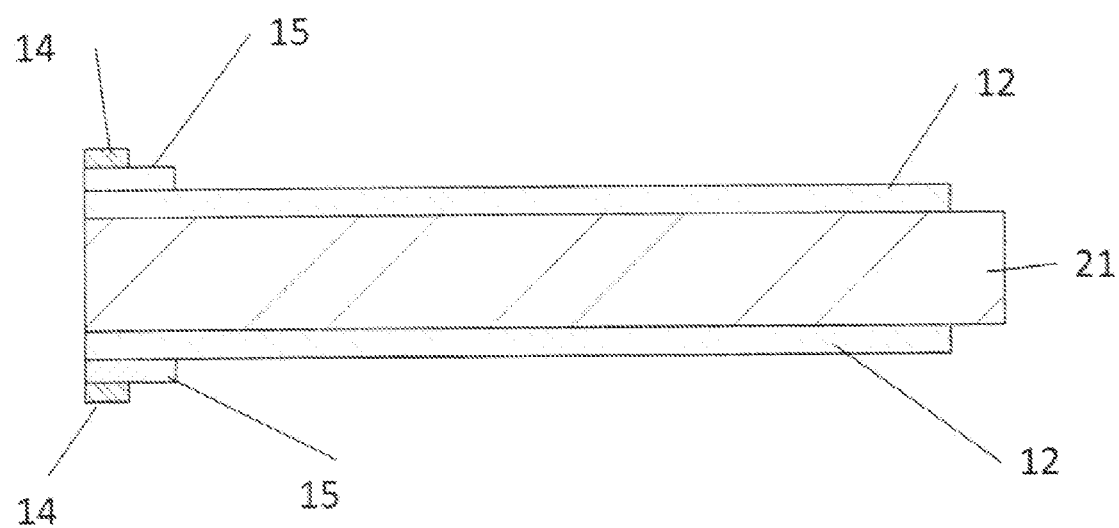
FIG. 2 is a cross section of a strip formed according to an embodiment of the invention prior to being coated with the dielectric.

As an example, the final strip shown in FIG. 2 in cross section may be about 50 mm wide and the width of the thicker metal layer 15 may be 5 mm. The thickness of the substrate 21 may be 12.7 um. The deposited metal may be aluminum with a resistance of twenty ohm/sq in the thinner portion and a resistance of 2 ohm/sq in the thicker portion.

In order to create areas where the dielectric does not cover the film, a masking material 14 is applied over the area of the film where the metal layer will be exposed, for example at the middle section of metal layer 15 as shown in FIG. 1. The masking material may be ink, polyvinyl alcohol, PMMA, photoresist or any other material that will separate from the metal coating after the dielectric layer has been applied as explained below.

The masking material may be applied to the film by any one of a plurality of known coating techniques. Such techniques are illustrated in FIG. 3 and include an ink jet 45, solid tape dispensers 44, a liquid dispensing nozzle 46, a material dispenser in combination with a slotted shield 43, or printing devices such as a gravure type printer 42. The film is moved under the dispensing device by a roller system 40, 41 that unwinds the film, applies the mask and rewinds the film as shown in FIG. 3. The mask may be applied ex-situ before loading in the coating system or in-situ in the coating system. The masking material is applied to both sides of the film.

The next step in the process is to apply a layer of dielectric material to both sides of the film. Thus can be done in accordance with the disclosure in U.S. Pat. No. 7,460,352 or by any other known method. The dielectric material may be formed from amorphous oxides, amorphous nitrides, or multi-layer stacks of amorphous oxides and nitrides.

Figure 4:
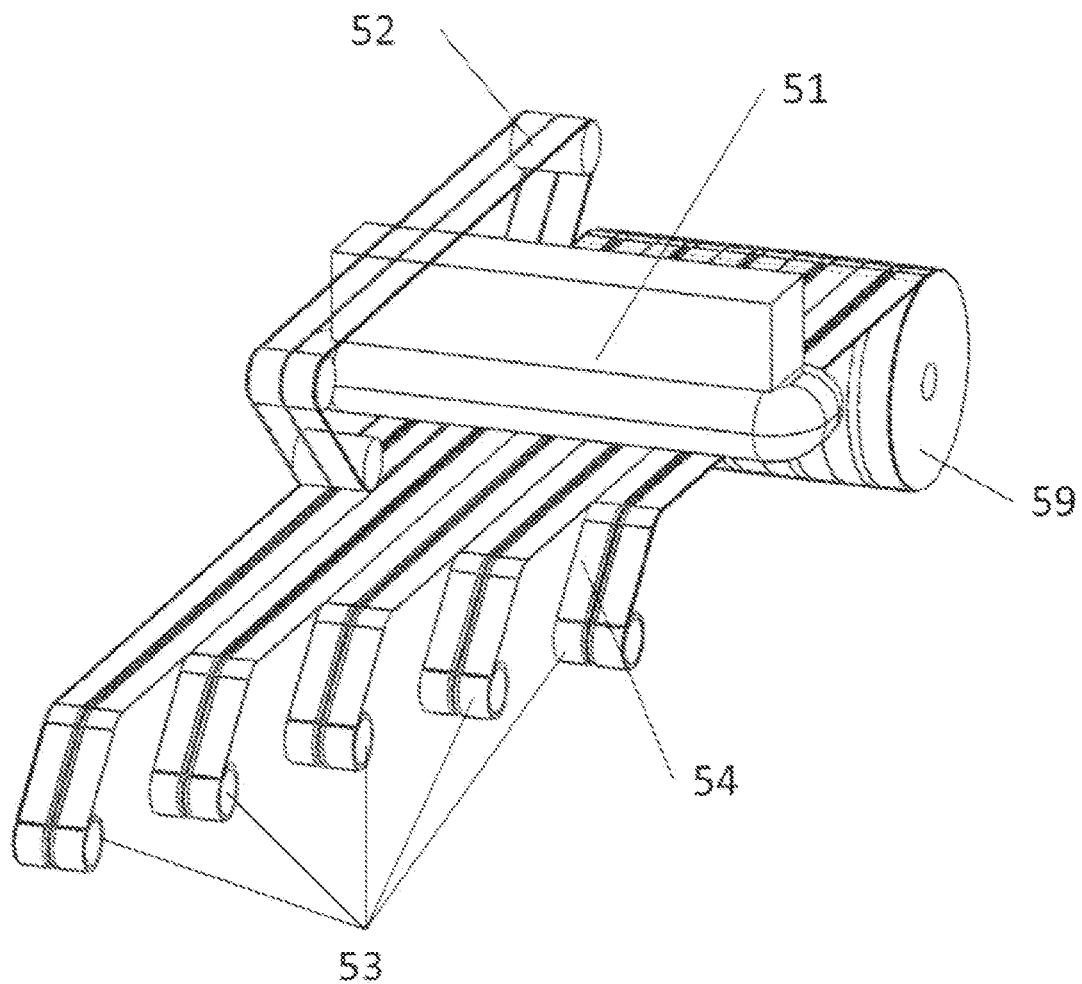
FIG. 4 is a perspective view showing the formation of plural strips by slitting and shielding strands
Figure 5:
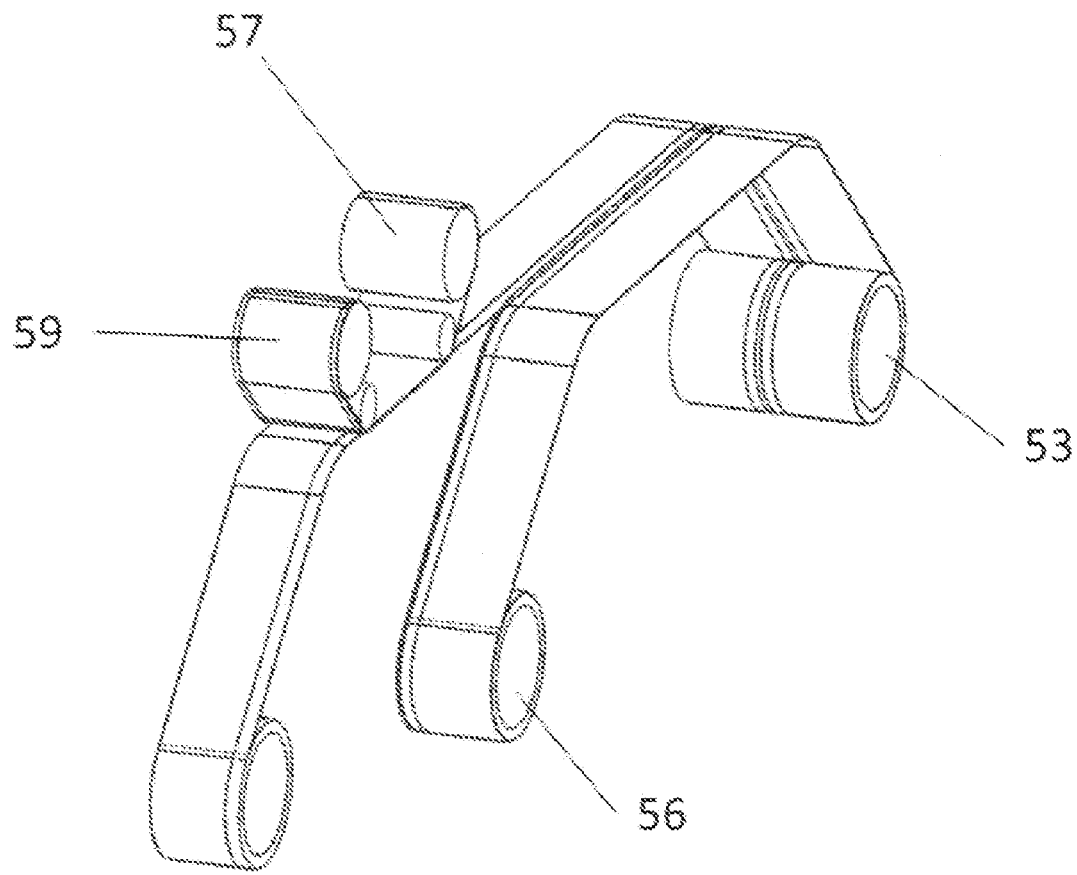
FIG. 5 is a perspective view showing the second slitting step and mask removal.

After dielectric deposition, the film is removed from the web coater and slit into first narrower sections 53 using a mechanical slitter or a laser saw as shown in FIG. 4. The slits will go through portion 13 of the substrate 21 that is not coated with metal. After this step, the strips 53 are slit along the thicker portion of the metalized layer 15 as shown in FIG. 5. The masking material along with dielectric material is then removed from both sides of the film by any suitable means. The masking material could also be removed prior to slitting. FIG. 5 illustrates rolls of tape 57, 59 that can be run over the surface of the film to strip off the dielectric and masking material. Other methods to remove the masking and dielectric material include immersion in a solvent with ultrasonic agitation. As the mask lifts off and dissolves, the dielectric material above the mask also releases from the substrate exposing the metalized edge.

Figure 6:
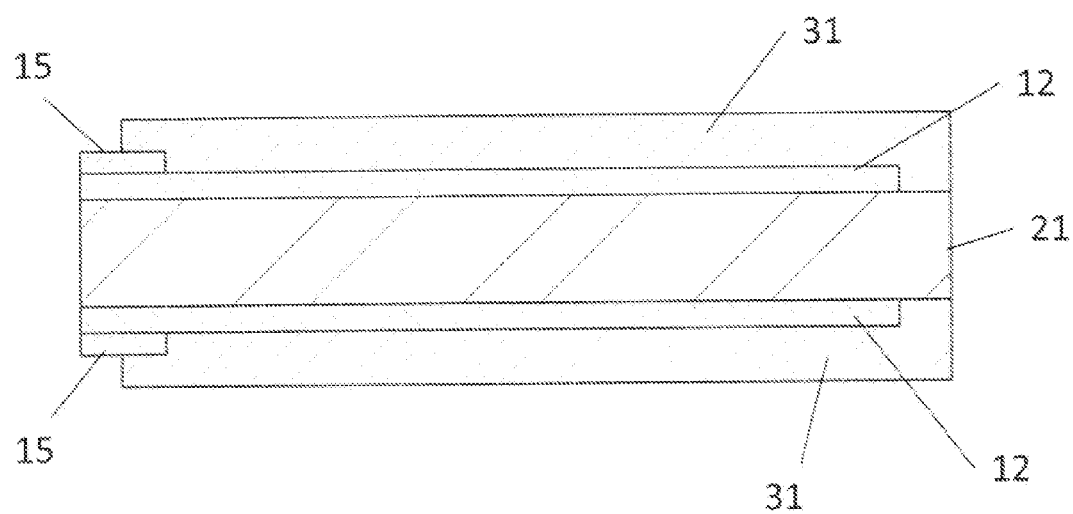
FIG. 6 is a cross sectional view of the finish strip according to an embodiment of the invention.

The final composition of the strip is shown in FIG. 6 and includes the substrate 21, metalized coatings 12 on both sides of the substrate, and dielectric layer 31 on both sides of the metalized strip. A portion of the thick section 15 of the metal layer is left uncovered on both sides by the dielectric after the masking material and the dielectric layer on top of it is removed. Also, the metalized layers 12 do not extend to the right edge of the strip as illustrated in FIG. 6.

Although the above described embodiment has the metalized layers and the dielectric on both sides of the substrate, the substrate could be metalized and then coated with a dielectric on one side only, using a mask or a masking material to form the metalized area for electrical contact.

The strip is now ready to be rolled into a final configuration as a capacitor as described in U.S. Pat. No. 7,460,352.

As an alternative to mask application and removal, the exposed metalized area 15 may be formed by shielding the strip during the deposition of the dielectric layer as shown in FIG. 4. A dielectric coating device 51 deposits a layer of dielectric material onto the film coming off of roller 59. A solid mask device 52 using a plurality of thin shielding strands prevents dielectric material from being deposited on certain areas of the film thus creating the exposed metal areas.

The above description is illustrative of embodiments of the invention. Various modifications will be evident to those skilled in the art without departing from the invention the scope of which is defined by the following claims. Furthermore the dimensions of the film and the thickness of the various layers as shown are for illustration only and can be varied according to the particular materials used and the desired characteristics of the final capacitor.

Although the present invention has been described with respect to specific details, it is not intended that such details should be regarded as limitations on the scope of the invention, except to the extent that they are included in the accompanying claims.

We claim:

1. A method of forming a plurality of dielectric coated metalized film strips for the formation of high temperature and high breakdown strength capacitors comprising:
   providing a substrate;
   depositing a metalized layer on the substrate;
   masking portions of the metalized layer with a masking material;
   coating the masked and unmasked portions of the metalized layer with a dielectric material;
   slitting the resultant assembly along the masked portions to form a plurality of strips; and
   removing the masking material and the dielectric material on the masking material from the metalized layer.

2. The method of claim 1 wherein the metalized area of the substrate has a portion with an increased thickness.

3. The method of claim 2 comprising slitting the resultant assembly along the portions of the resultant assembly that have an increased thickness metal layer.

4. The method of claim 3 including further slitting the resultant assembly along an area of the substrate that is not metalized.

5. The method of claim 1 wherein the masking material is applied by an ink jet, tape dispenser, dispensing head, shield or a printing device.

6. The method of claim 1 wherein the masking material is removed by applying a sticky tape to the masked area and then removing it.

7. The method of claim 1 wherein the masking material is removed by immersing the strip in a solvent.

8. The method of claim 1 wherein the dielectric material is formed from amorphous oxides, amorphous nitrides, or multi-layer stacks of amorphous oxides and nitrides.

9. The method of claim 1 wherein a metalized layer is deposited on both sides of the substrate, masking material is placed on both metalized layers; and
   both metalized layers are coated with a dielectric material.

10. A method of manufacturing a capacitor comprising:
    providing a substrate;
    depositing a metalized layer on the substrate;
    masking portions of the metalized layer with a masking material;
    coating the masked and unmasked portions of the metalized layer with a dielectric coating;
    removing the masking material and the dielectric material on the masking material from the metalized layer;
    slitting the resultant assembly along the masked areas to form a plurality of strips; and
    winding or coiling the strips to form a capacitor.

11. The capacitor produced by the method of claim 10.

12. A method of forming a plurality of dielectric coated metalized film strips for the formation of high temperature and high breakdown strength capacitors comprising:
    providing a substrate;
    depositing a metalized layer on the substrate;
    shielding portions of the metalized layer;
    coating the unshielded portions of the metalized layer with a dielectric material; and
    slitting the resultant assembly along the shielded portions to form a plurality of strips.

13. A method of manufacturing a capacitor comprising:
    providing a substrate;
    depositing a metalized layer on the substrate;
    shielding portions of the metalized layer;
    coating the unshielded portions of the metalized layer with a dielectric material;
    slitting the resultant assembly along the shielded portions to form a plurality of strips; and
    winding or coiling the strips to form a capacitor.

* * * * *